United States Patent

Lesartre

[15] 3,697,684

[45] Oct. 10, 1972

[54] TELEVISION TRANSMITTER WITH THE SYNCHRONIZATION SIGNAL APPLIED TO THE OSCILLATOR AND THE LUMINANCE SIGNAL APPLIED TO A MODULATOR

[72] Inventor: Paul Lesartre, Paris, France

[73] Assignee: U.S. Philips Corporation, New York, N.Y.

[22] Filed: Oct. 30, 1969

[21] Appl. No.: 872,522

[30] Foreign Application Priority Data

Oct. 31, 1968 France....................68172256

[52] U.S. Cl..............178/7.2, 178/69.5 G, 178/69.5 S

[51] Int. Cl................................................H04n 5/40

[58] Field of Search...........178/69.5 G, 69.5 TU, 7.2; 331/107 G; 332/52

[56] References Cited

UNITED STATES PATENTS

| | | | |
|---|---|---|---|
| 2,204,427 | 6/1940 | Moller | 178/7.2 |
| 2,987,574 | 6/1961 | Gatfield | 178/69.5 TU |
| 3,422,289 | 1/1969 | Atalla et al. | 332/52 |
| 3,465,265 | 9/1969 | Kurw | 332/52 |
| 3,477,029 | 11/1969 | Copeland | 331/107 G |

FOREIGN PATENTS OR APPLICATIONS

| | | |
|---|---|---|
| 957,228 | 1/1957 | Germany |

*Primary Examiner*—Robert L. Griffin
*Assistant Examiner*—Donald E. Stout
*Attorney*—Frank R. Trifari

[57] ABSTRACT

A television transmitter for positive modulation television signals has a Gunn oscillator which is switched off by the synchronization signals coming from a synchronization separator. An isolator couples the oscillator to a Gunn effect modulator to which the luminance signal is applied from a difference amplifier. Therefore, the inability of the modulator to produce zero output during the sync pulses is overcome.

6 Claims, 5 Drawing Figures

INVENTOR.
PAUL LESARTRE
BY
AGENT

INVENTOR.
PAUL LESARTRE
BY
Frank R. Trifari
AGENT

TELEVISION TRANSMITTER WITH THE SYNCHRONIZATION SIGNAL APPLIED TO THE OSCILLATOR AND THE LUMINANCE SIGNAL APPLIED TO A MODULATOR

The invention relates to a transmitter of positively modulated television signals comprising a carrier wave oscillator for producing a differential amplifier acting as a carrier wave and a modulator connected thereto governed by the video signal.

Such a second transmitter is known from German Pat. specification No. 957.228, which comprises as a modulator a multi-grid tube. To one of the grids of this tube is applied the video signal, whereas in order to obtain an adequate modulation percentage the synchronizing pulses of the video signal are applied to a further grid for suppressing the carrier wave in this modulator tube during the presence of these synchronizing pulses.

The invention has for its object to provide a new concept of a transmitter of positively modulated television signals of the type referred to above with a high modulation percentage during the synchronizing pulses, which transmitter is particularly suitable for the use of Gunn effect elements operating in the range of the microwave frequencies.

The transmitter of positively modulated television signals in accordance with the invention is characterized in that the carrier wave oscillator is provided with a control-terminal to which the synchronizing pulses are applied and is designed to interrupt the oscillations during each synchronizing pulse.

The invention will be described more fully with reference to the accompanying drawing.

Figure 1:
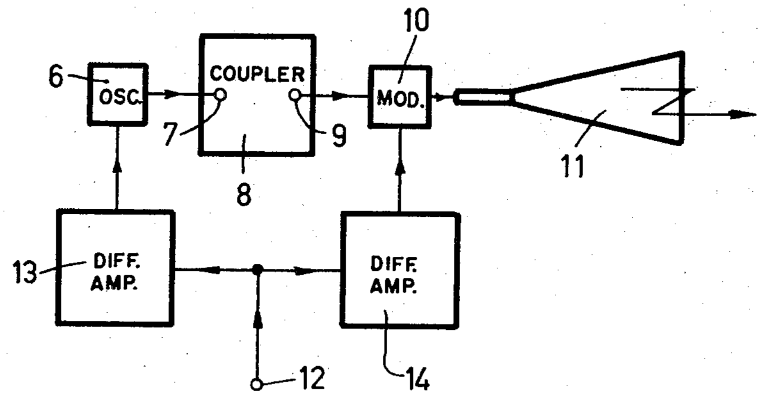
FIG. 1 is a block diagram of the transmitter for positively modulated TV signals in accordance with the invention.

FIGS. *4a* and *4b* are graphs illustrating the supply voltage of the Gunn effect diode of the oscillator stage 6 of FIG. 1 as a function of time and the corresponding variations of the level of the carrier wave of very high frequency available at the output of said stage.

The embodiment on which by way of non-limiting example the following description is based is that of an equipment operating at about 10 to 11 GHz in the frequency band usually termed the X band, there being used accessories having more or less standardized properties commonly employed at these frequencies.

Referring to FIG. 1, reference numeral 6 designates a Gunn effect diode oscillator obtained by using as a cavity resonator a short waveguide portion for the X band, the electric length of which portion, taking the presence of the Gunn effect diode into consideration, is equal to $n\pi/2$, wherein n is in this case preferably equal to 1 or 2. The high-frequency output of the oscillator 6 is connected to one of the ports 7 of a non-reciprocal directional device 8, an output 9 of which is connected to a modulator 10. The non-reciprocal directional device 8 is preferably formed by a known member, generally termed "gyrator" or "circulator" having three ports, the third port following the output 9 in the sense of circulation of the hyperfrequency energy (not shown), being connected to an ohmic load of suitable value matching the standardized characteristic impedance of the components of the X-band. Device 8 isolates the oscillator 6 from the influence of the modulator 10. It is described in "Proc. of the Symposium on Modern Advances in Microwave Techniques;" Nov. 8, 9, and 10; pp. 188–195.

The modulation stage 10 is formed by a very short waveguide portion, reduced for use in the X band and comprising at its center a Gunn effect diode used as a modulator. By biassing this Gunn effect diode by a voltage lower than its threshold voltage an amplitude modulation can be obtained which is free of frequency modulation. The output of the modulator 10 is connected to the input of a radiating device 11, which is formed in this example by a horn, but may be formed by any conventional radiating device in the X band and it may be completed by a reflective parabola.

The circuitry is provided with an input 12 for the modulation to be transmitted by the transmitter, which input is connected to two sources 13 and 14 corresponding to the oscillator 6 and to the modulator 10 respectively. The source 13 comprises a differential transistor amplifier having a low output impedance and permitting of adjusting the value of the negative direct voltage applied to the cathode of the Gunn effect diode oscillator and the value of the instantaneous reduction of said voltage at the instants corresponding to the synchronizing pulses. The amplifying part providing this instantaneous voltage reduction is not sensitive to the components of the composite video-frequency signal with respect to the structure of the image and the lines of identification and comprises adjusting means providing the relative independence of the control of the negative base voltage and the instantaneous voltage reductions.

The source 14 of the Gunn effect diode modulator comprises a differential transistor amplifier having a low output impedance, arranged so that a given negative minimum voltage is applied to the cathode of the diode modulator (for example, 1 V) when the signal applied to the input 12 corresponds to a white spot of maximum brightness in the image and a higher negative voltage (3 V e.g.)m when the signal applied to the input 12 corresponds to the black level. Within this voltage range the modulation of the carrier wave from the oscillator 6 and passing through the non-reciprocal directional device 8 is in this example substantially linear. Beyond this range the modulation of the carrier wave remains possible, but it is no longer linear in the example described; the resultant modulation characteristic is shown in FIG. 3.

Figure 2:
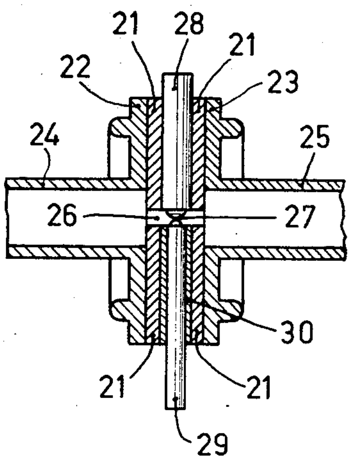
FIG. 2 is a partial, schematic sectional view of one embodiment of the Gunn effect diode modulation stage, designated by 10 in FIG. 1.

As shown in FIG. 2 a reduced waveguide portion 21 is connected between the terminals 22 and 23 of two elements of waveguides in the X band 24 and 25 respectively, which correspond to the output of the non-reciprocal directional device 8 and to the input of the radiating device 11 of FIG. 1 respectively. The reduced waveguide portion 21 and the terminals 22 and 23 are mechanically and electrically integral by assembling means (not shown). The guides 24 and 25 have nominal dimensions of 10.16 mms of internal height, shown in the sectional view in FIG. 2 and 22.86 mms of internal width. The reduced waveguide portion 21 of this embodiment has the shape of a solid metal disc whose external diameter corresponds with that of the terminals 22 and 23, the thickness being about 10 mms, whilst a horizontal gap 26 is provided therein, the width of which is equal to the width of the guides 24 and 25, and the height is about 2 mms. A Gunn effect diode 27 is arranged at the center of the gap 26. The anode of the diode 27 is fastened to a metal cylinder 28 arranged in the waveguide portion 21 with which it is in intimate mechanical, electrical and thermal contact. The anode of the diode 27 is therefore connected to the mass of the device and the modulation voltage is applied to the cathode of the diode 27 via a cylindrical metal bar 29 bearing on the cathode contact of said diode and being insulated from the waveguide portion 21 by a thin insulating sleeve 30.

Figure 3:
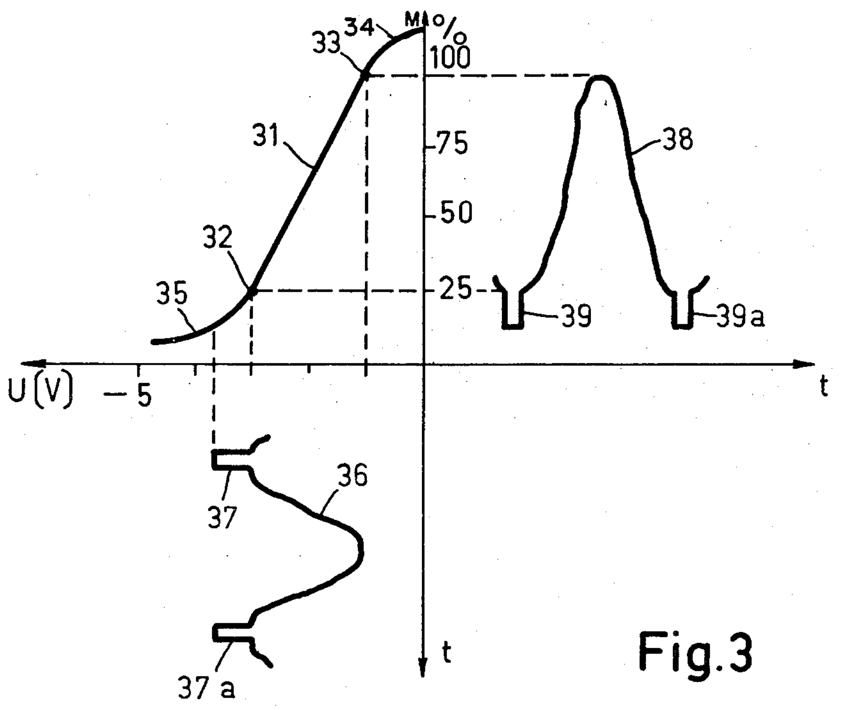
FIG. 3 is a graph of the characteristics of the modulation at the output of the modulation stage 10 in a given case.

When a signal of a given stable level is applied to the input of the non-reciprocal directional device 8, the signal level that is emanating from the waveguide portion 21 varies with the bias voltage of the Gunn effect diode 27 in accordance with the curve 31 in the upper lefthand quadrant of FIG. 3. Therefore, modulation 10 is an amplitude modulator. In this case the curve 31 is substantially linear between the points 32 and 33 corresponding to bias values of −3V and −1V respectively. Beyond the point 33 in the part 34 of the curve corresponding to a bias voltage between −1V and 0 the curve is inclined downwards. In the lower parts of the curve on the left-hand side of point 32 for bias voltages exceeding −3V the variation of the level is no longer linear and the modulation effect decreases. The true mechanism to which the variable transmission effect of the modulator 10 has to be attributed is not completely defined, but the observations made in the Applicant's laboratory suggest that variations in transmission and reflection of VHF waves are concerned which are linked to high-frequency impedance variations of the Gunn effect diode modulator resulting from variations of the bias voltage of said diode below its threshold voltage for oscillating. In the case of the device used for drawing the curve 31, given by way of example, the oscillation threshold voltage of the diode 27 is about 5 V. Modulator 10 is described in "Electronics Letters;" Vol. 4, No. 5, July 26, 1968; pages 317–318.

When the modulation device 10 in the transmitter in accordance with the invention is switched on, the source 14 is adjusted so that the point 33, i.e., the upper limit of the linear portion of the curve 31, coincides with the maximum white level or in terms of modulation percentage of the transmitted signal, to 100 percent and that the point 32, i.e. the lower limit of the linear portion of the curve 31, coincides with the black level (30 percent) or with the blanking level (25 percent). A television signal thus calibrated and corresponding to an image line framed by the synchronizing signal preceding the same and by the synchronizing signal following it is illustrated in the left-hand lower quadrant of FIG. 3 in the form of a curve 36 framed out by the square-wave forms 37 and 37*a* of the synchronizing signals.

The modulation curve of the signal transmitted by the modulator 10 to the radiating device 11 is illustrated at 38 in the upper right-hand quadrant of FIG. 3, framed out by the square-wave synchronizing signals 39 and 39*a*. On the basis of the shape of the overall curve 31 it will be apparent that the curve 38 is a true reproduction of the curve 36 but that the modulation level corresponding to the bottoms of the square-wave periods 39 and 39*a* is too high.

Figure 4A:
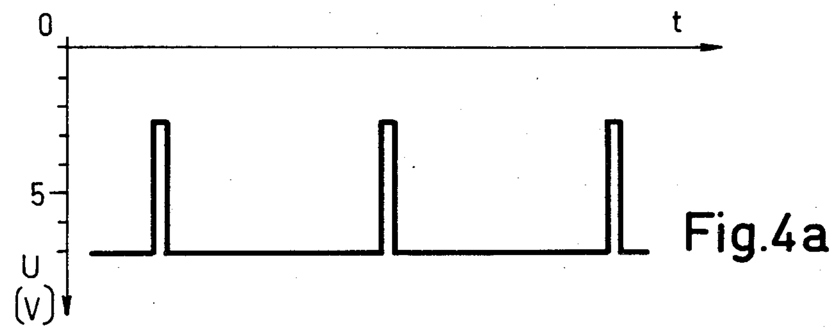
Figure 4B:
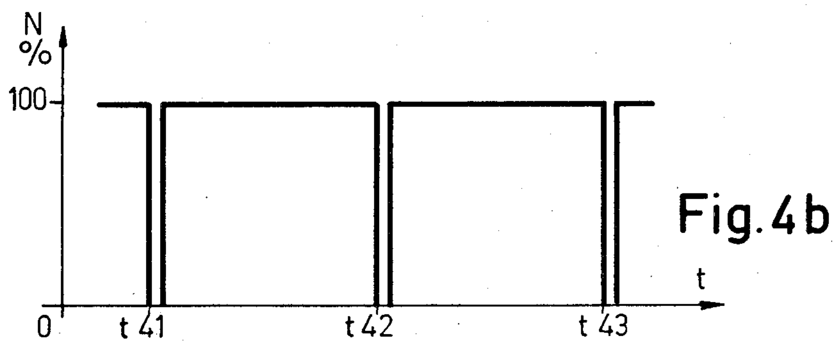

This imperfect modulation of the pulses of the modulator 10 is mitigated by the combination of measures applied to the transmitter in accordance with the invention; this will be better understood from FIGS. 4*a* and 4*b*.

The graph of FIG. 4*a* illustrates the shape of the voltage applied to the Gunn effect diode of the oscillator 6 as a function of time: during the time intervals corresponding to the transmission of the image modulation proper the voltage applied to the cathode of said diode, whose anode is connected to earth, is −7V with a threshold voltage $V_S$ of about −3V. At the instants corresponding to the synchronizing signals the synchronizing pulse separator of the source 13 applies a positive signal to the oscillator 6, and thus reduces this voltage (in the negative sense) to a value of approximately equal to the threshold voltage and equal to about 2.5 V in the embodiment concerned. Therefore, during the synchronization pulses, oscillator 6 stops oscillating.

The level variations of the signal supplied by the oscillator 6 at the input of the non-reciprocal directional device 8 due to the variations of the supply voltage are illustrated in FIG. 4*b*. At the instants $t_{41}$, $t_{42}$, $t_{43}$ . . . corresponding to the leading edge of each synchronizing signal the oscillator 6 ceases oscillating and the level of the transmitted signal drops to zero. At the termination of each synchronizing signal the oscillator restarts at its normal working voltage while it supplies a signal of the level N and of stable frequency so that the incapacity of the modulator 10 to reduce practically to zero at the output the level of the signal applied to its input across the device 8 is obviated. The embodiment described in the foregoing, based on the use of standardized elements of waveguides in the X band or intended for connection to said elements is not at all limiting and may be readily varied. The embodiment may be an "integrated" circuit based on the use of flat propagation lines with solid dielectrics (strip-lines and micro strip-lines), while the non-reciprocal directional device may be of the type disclosed in the Pat. application of the applicant filed under Nr. PV 159866 of July 19th 1968 in respect of: "Reseau hyperfrequence directionnel non-reciproque." The transmitter for positive modulated TV signals described above permits on the one hand a linear modulation of the signal of stable frequency produced by the Gunn effect diode oscillator in the whole level range required by the transmission of the "image signal" portion of a composite video signal with positive image modulation while a given margin of modulation possibilities is preserved below the level of 25 percent corresponding to the black level of such a signal according to the standard L of the C.C.I.R. (Comite International de Radiodiffusion) in order to allow, for example, a correct transmission of signals such as the color identifying signals employed in the so-called SECAM color television system and on the other hand by the influence exerted on the oscillator stage at the instant of the transmission of the synchronizing pulses a completion of the modulation by the auxiliary Gunn effect diode arranged in the waveguide portion coupled with the radiating device and a perfect transmission of the synchronizing pulses, at which instant the signal level has to be lower than 6 percent (standard L) or 3 percent (standard E) of the maximum white level.

What is claimed is:

1. A circuit for transmitting television signals comprising synchronization and luminance component signals modulated in a positive sense on a carrier wave comprising a two terminal semi-conductor oscillator; means for applying said synchronization signal to said oscillator to interrupt oscillations of said oscillator; and a semi-conductor amplitude modulator having an input coupled to said oscillator, a control input means for receiving said luminance signal, and an output means for supplying oscillations amplitude modulated by said luminance signal.

2. A circuit as claimed in claim 1 wherein said oscillator comprises a Gunn effect semiconductor and said oscillator control terminal is coupled to a source of supply voltage.

3. A circuit as claimed in claim 2 wherein said applying means comprises a synchronization separator having a first input terminal coupled to receive a reference potential, a second input coupled to receive said synchronization signal, and an output coupled to said oscillator control terminal.

4. A circuit as claimed in claim 1 wherein said modulator comprises a Gunn effect semiconductor.

5. A circuit as claimed in claim 4 further comprising a difference amplifier having an input coupled to receive said luminance signal and an output coupled to said modulator control input.

6. A circuit as claimed in claim 1 further comprising an isolator coupled between said oscillator and said modulator.

* * * * *

PO-1050
(5/69)

UNITED STATES PATENT OFFICE
CERTIFICATE OF CORRECTION

Patent No. 3,697,684 Dated October 10, 1972

Inventor(s) PAUL LESARTRE

It is certified that error appears in the above-identified patent and that said Letters Patent are hereby corrected as shown below:

On the Title page, line 12, cancel "68172256" and insert -- 172256 --;

Signed and sealed this 6th day March 19 73.

(SEAL)
Attest:

EDWARD M.FLETCHER,JR.
Attesting Officer

ROBERT GOTTSCHALK
Commissioner of Patents